United States Patent Office 3,285,922
Patented Nov. 15, 1966

3,285,922
N-CYCLOPROPYLMETHYL- AND -CYCLOBUTYL-
METHYL-MORPHINANS
Marshall D. Gates, Jr., Pittsford, N.Y., assignor to Research Corporation, New York, N.Y., a corporation of New York
No Drawing. Filed Oct. 25, 1963, Ser. No. 318,835
9 Claims. (Cl. 260—285)

This application is a continuation-in-part of my prior co-pending application Serial No. 169,089, filed Jan. 26, 1962, and now abandoned.

This invention relates to new derivatives of 1,3,4,9,10,10a-hexahydro-2H-10,4a - iminoethanophenanthrene, to the preparation thereof, and to intermediates for the same. Further, this invention relates to a process for producing analgesia in humans.

The novel compounds of this invention have pharmacodynamic activity. They are useful in humans as agents for producing analgesia, thus relieving pain, and are also useful as antagonists of certain strong analgesic agents, such as morphine and meperidine.

My new compounds are the N-($CH_2$—Y)-6-hydroxy-1,3,4,9,10,10a-hexahydro - 2H - 10,4a-iminoethanophenanthrenes having the structural formula (wherein for purposes of convenience two of the rings have been arbitrarily labeled as B and C):

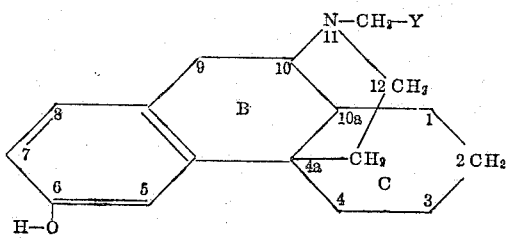

Formula I wherein Y is a member of the group consisting of cyclopropyl and cyclobutyl.

My new compounds can exist in stereochemically isomeric forms, that is, optical isomers and geometric isomers. If desired, the isolation or the production of a particular stereochemical form can be accomplished by application of the general principles known in the prior art. The cis and trans isomers are alternatively and more simply named as morphinans and isomorphinans, respectively, instead of as iminoethanophenanthrenes. Thus, using this nomenclature the forms having rings B/C cis can be designated as N-($CH_2$—Y)-3-hydroxymorphinans, and the forms having rings B/C trans can be designated as N-($CH_2$—Y)-3-hydroxyisomorphinans.

The preparation of my new N-($CH_2$—Y)-6-hydroxy-1,3,4,9,10,10a-hexahydro-2H - 10,4a-iminoethanophenanthrenes is conveniently carried out by interacting an acid chloride having the formula Y—CO—Cl with 6-hydroxy-1,3,4,9,10,10a-hexahydro-2H - 10,4a-iminoethanophenanthrene and then reducing the resulting N-(CO—Y)-6-hydroxy-1,3,4,9,10,10a-hexahydro - 2H-10,4a-iminoethanophenanthrene by treatment with lithium aluminum hydride. If desired, the corresponding 6-methoxy compound can be used as the starting material, in which case the acylation and reduction steps, which result in the formation of the N-($CH_2$—Y)-6-methoxy-1,3,4,9,10,10a-hexahydro-2H - iminoethanophenanthrenes having the structural formula

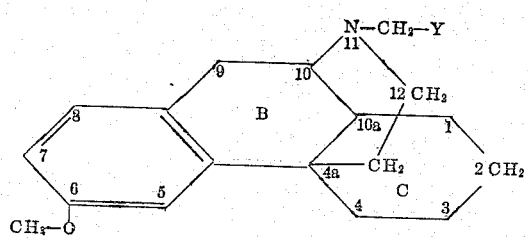

Formula II are followed by an O-demethylation step to convert the 6-methoxy group to a 6-hydroxy group.

Due to the presence of a basic tertiary amino grouping, the compounds of Formula I react with organic and inorganic acids to form acid-addition salts; and, due to the presence of both a basic tertiary amino grouping and an acidic phenolic grouping, my new compounds have amphoteric properties; and therefore for a given compound, the particular molecular species which will predominate will depend on the pH of the environment. Thus, in strongly acidic media, the amino nitrogen will be protonated, and the predominant molecular species will be an acid-addition salt. On the other hand, in strongly alkaline media, the predominant molecular species will be that of a phenolate ion; and under pH conditions intermediate between these extremes, the proportion of the undissociated molecular species will increase to reach a maximum as the isoelectric point is approached, the form which is isolable at the isoelectric point being conveniently termed the isoelectric form.

The acid-addition salts are prepared in conventional fashion, for instance either by direct mixing of the acid and the free base or isoelectric form or, when this is not appropriate, by dissolving either or both of the acid and the free base or isoelectric form separately in water or an organic solvent and mixing the two solutions, or by dissolving both the acid and the free base or isoelectric form together in a solvent. The resulting acid-addition salt is isolated by filtration, if it is insoluble in the reaction medium, or by evaporation of the reaction medium to leave the acid-addition salt as a residue. The acid moieties or anions in these salt forms are in themselves neither novel nor critical and therefore can be any acid anion or acid-like substance capable of salt formation with the free base or isoelectric forms of my compounds.

The phenolate forms are readily obtained for example by treating the isoelectric form with a strong alkali, such as sodium hydroxide. The alkali metal phenolates are water-soluble.

The acid-addition salt forms and the phenoxide forms of my new compounds are useful not only as analgesic agents and as antagonists of certain strong analgesic agents, as above-indicated, but are also useful for characterizing and identifying purposes, and in isolation or respectively, and accordingly all of the acid-addition salts and the phenoxides are sources of the free base forms and the isoelectric forms, by reaction with bases or acids, respectively, and accordingly all of the acid addition salts and the phenoxides, regardless of considerations of solubility, toxicity, physical form, or the like of a particular compound are useful for the purposes of my invention.

It will be appreciated from the above that if one or more of the characteristics, such as solubility, molecular weight, physical appearance, toxicity, or the like of a given free base, isoelectric, phenoxide, or acid-addition salt form of a particular compound render that form unsuitable for the purpose at hand, it can be readily converted to another, more suitable form.

The N-(H)-6-hydroxy and methoxy-1,3,4,9,10,10a-hexahydro-2H-10,4a-iminoethanophenanthrene starting materials for the preparation of my new compounds are obtainable by procedures known in the art. The trans forms, 3-hydroxymorphinan and 3-methoxymorphinan are old; and the cis forms, 3-hydroxyisomorphinan and 3-methoxyisomorphinan, can be readily prepared from the known N-methyl-3-methoxyisomorphinan by N-demethylation and O-demethylation reactions.

The structures of the compounds of this invention followed from the methods of synethesis which were used and from the elementary analyses of the products obtained.

My invention is illustrated by the following examples without, however, being limited thereto.

*Example 1*

A mixture of 1.9 g. of (—)-3-hydroxymorphinan, 80 ml. of dichloromethane, 14 ml. of triethylamine and 2.1 g. of cyclopropylcarbonylchloride was refluxed for 12 hours. The reaction mixture was cooled, washed with dilute hydrochloric acid, then with water, dried over potassium carbonate and evaporated giving 3.0 g. of amorphous material. A portion of this was purified by short path distillation onto a cold finger to give the bis-cyclopropylcarbonyl derivative of (—)-3-hydroxymorphinan as a pure white amorphous solid $[\alpha]_D^{30} = -164°$ (c. 2.15, 95% ethanol).

A solution of 2.65 g. of the bis-cyclopropylcarbonyl derivative of (—)-3-hydroxymorphinan in 70 ml. of purified tetrahydrofuran was added to 0.6 g. of lithium aluminum hydride in 50 ml. of tetrahydrofuran. The mixture was stirred at room temperature for twenty hours, and then the excess hydride was decomposed with 6 ml. of ethyl acetate. Saturated aqueous ammonium tartrate solution (125 ml.) was then added and the mixture was stirred for one hour. The tetrahydrofuran layer was separated and the aqueous layer was extracted with dichloromethane. The combined organic layers were dried over sodium sulfate and evaporated to give 2.07 g. crystalline material. This product was recrystallized from ethyl acetate to yield (—)-N-cyclopropylmethyl-3-hydroxymorphinan as white needles which melted at 187.5–189° C. and had $[\alpha]_D^{30} = -120°$ (c. 2.25, 95% ethanol). Its infrared spectrum showed cyclopropane absorption at 1016 cm.$^{-1}$.

*Example 2*

A mixture of 7.1 g. of β-dihydrothebainone, 150 ml. of purified diglyme (diethyleneglycol dimethyl ether) and 29–30 ml. of 95+% hydrazine was treated with stirring with 30 g. of potassium hydroxide pellets and the mixture was heated to gentle reflux when nitrogen evolution started (the reflux temperature was 114° C., the boiling point of hydrazine.). After six and one half hours the reaction mixture was poured into 300 ml. of cold water and stored in the cold for several hours. The crystalline material was collected and washed with 50% ethanol-water. Recrystallization of this product from 95% ethanol yielded 6.9 g. of (—)-4-hydroxy-N-methyl-3-methoxyisomorphinan as a hemihydrate, M.P. 138–150° C.

A mixture of 4.0 g. of (—)-4-hydroxy-N-methyl-3-methoxyisomorphinan hemihydrate, 3.4 g. of a 49% dispersion of sodium hydride in mineral oil, and 100 ml. of dry toluene was stirred for one half hour until hydrogen evolution had ceased. To this mixture there was slowly added 8.0 g. of 2,4-dinitrofluorobenzene in 40 ml. of toluene followed by 20 ml. of purified dimethylformamide. The resulting mixture was stirred at room temperature for one hour and then refluxed for one hour. The resulting dark brown solution was thoroughly washed with 10% aqueous sodium hydroxide solution. After evaporation of the toluene the residue was taken into ether, extracted with several portions of 0.1 N hydrochloric acid, and re-extracted into ether after basifying the aqueous layer with ammonia. Evaporation of the ether gave 11–12 g. of residue which was eluted through a column of 100 g. of grade I Merck alumina in ether to yield 10.6 g. of the 2,4-dinitrophenyl ether of (—)-4-hydroxy-N-methyl-3-methoxyisomorphinan as a light yellow foam. This product did not readily crystallize or form a crystalline picrate or hydrochloride, and was used without further purification.

A mixture of 10.6 g. of the 2,4-nitrophenyl ether of (—)-4-hydroxy-N-methyl-3-methoxyisomorphinan and 650 mg. of platinum oxide (prereduced in 50 ml. of ethanol) in 350 ml. of absolute ethanol was shaken with hydrogen at atmospheric pressure until no more uptake was observed (ca. fifteen hours). The initial uptake was extremely rapid. Total uptake was ca. 3.4 l. (3.2 l. theoretical). The catalyst was removed by rapid filtration and the ethanol was removed under diminished pressure. The solution on exposure to air rapidly turned red. The red-brown residue, which was the 2,4-diaminophenyl ether of (—)-4-hydroxy-N-methyl-3-methoxyisomorphinan, was used quickly in the next reaction without purification or characterization; it was dissolved in 75 ml. of purified tetrahydrofuran and diluted with 400 ml. of liquid ammonia; and sodium was then added in small lumps with swirling until a deep blue color persisted for two minutes. About 10 ml. of ethanol was added to decompose the excess sodium. After allowing the ammonia to evaporate and the flask to come to room temperature, the very dark residue was partitioned between ether and 10% aqueous sodium hydroxide solution. After thorough washing of the ether layers with 10% aqueous sodium hydroxide solution, the ether layers were dried over potassium carbonate and evaporated under diminished pressure to yield 6.2 g. of brown oil. Elution of this brown oil through 70 g. of grade I neutral alumina with benzene-ether gave 5.6 g. of (—)-N-methyl-3-methoxyisomorphinan as colorless oil. After purification through its picrate followed by molecular distillation at 93–97° C. at $1-3 \times 10^{-3}$ mm. Hg, it had $[\alpha]_D^{27} = -45°$ (c. 1.51, 95% ethanol). It formed a crystalline picrate, M.P. 203–214° C. (acetone).

To a cool stirred solution of 1.9 g. cyanogen bromide in 15 ml. of chloroform there was rapidly added a solution of 3.9 g. of (—)-N-methyl-3-methoxyisomorphinan in 40 ml. of chloroform. The solution was stirred with cooling for one hour and then gently refluxed for two additional hours. Evaporation of the chloroform gave 5.5 g. of a cloudy orange oil. The oil was taken into ether, washed with water, dilute hydrochloric acid and dilute sodium carbonate. Drying and evaporation of the ether gave 3.8 g. of a very viscous orange oil. The oil was eluted through a column of 120 g. of grade I neutral alumina with benzene-ether to yield 2.1 g. of (—)-N-cyano-3-methoxyisomorphinan as a colorless viscous oil whose infrared spectrum shows strong adsorption at 2200 cm.$^{-1}$, attributable to the N-cyano group. An analytical sample of this compound was prepared by molecular distillation at 120–124° C. at $1 \times 10^{-3}$ mm. Hg; it had $[\alpha]_D^{30} = -161°$ (c. 1.28, 95% ethanol).

A mixture of 2.1 g. of (—)-N-cyano-3-methoxyisomorphinan in 140 ml. of 6% hydrochloric acid was refluxed for eighteen hours. The acidic solution is made basic with ammonia and extracted with ether. The ether solution was extracted with dilute hydrochloric acid, the acid solution made basic with ammonia, and the basic solution extracted with ether. Drying and evaporation of the ether gave 1.7 g. of a yellow oil. (If allowed to stand, this oil readily absorbs atmospheric carbon dioxide and forms a low melting solid.) Purification of this oil through its picrate followed by molecular distillation at 100–105° C. at $1 \times 10^{-3}$ mm. Hg gave (−)-3-methoxy-isomorphinan. This product had $[\alpha]_D^{28} = -35°$ (c. 1.99, 95% ethanol). The picrate readily crystallized from acetone, M.P. 225–228° C. The crystalline L(+)-tartrate melted at 193.5–195.5° C.

To a solution of 3.8 g. of (−)-3-methoxyisomorphinan in 60 ml. of dichloromethane and 10 ml. of triethylamine there was added 2.4 g. of cyclopropylcarbonylchloride in 20 ml. dichloromethane. The mixture was heated under reflux for ten hours, washed with dilute acid until the washings were acid, and then washed with dilute aqueous sodium carbonate solution. The dichloromethane solution was put through 10 g. of grade I Merck alumina. Evaporation of the dichloromethane yielded 4.9 g. of (−)-N-cyclopropylcarbonyl-3-methoxyisomorphinan as a yellow glass. A small portion of this glass was distilled onto a cold finger at 145–148° C. at $1 \times 10^{-3}$ mm. Hg to give a colorless glass which had $[\alpha]_D^{26} = -178°$ (c. 1.48, 95% ethanol).

A suspension of 0.7 g. of lithium aluminum hydride in 50 ml. of anhydrous ether was treated slowly with 4.8 g. of (−)-N-cyclopropylcarbonyl-3-methoxyisomorphinan in 75 ml. ether and the resulting mixture was then stirred for twelve hours at room temperature. The excess hydride was cautiously decomposed with 3 ml. of saturated aqueous sodium sulfate solution. After removal of the aluminum salts the ether solution was extracted with dilute hydrochloric acid. The acidic solution was made basic with ammonia and extracted with ether. Drying and evaporation of the ether gave 4.2 g. of (−)-N-cyclopropylmethyl-3-methoxyisomorphinan as a colorless oil. Molecular distillation of a small portion of this product at 125–127° C. at $1 \times 10^{-3}$ mm. Hg gave an analytical sample which had $[\alpha]_D^{26} = -90°$ (c. 1.91, 95% ethanol).

Pyridine hydrochloride (3 g.) and 1.0 g. of (−)-N-cyclopropylmethyl-3-methoxyisomorphinan were heated together under a gentle stream of nitrogen at 215–220° C. for sixteen minutes. The reaction mixture was then diluted with 30 ml. water, made basic with ammonia and extracted with chloroform. Drying and evaporation of the chloroform gave 1.1 g. of (−)-N-cyclopropylmethyl-3-hydroxyisomorphinan as an orange viscous oil. The hydrochloride was formed with one-half ml. of concentrated hydrochloric acid; recrystallization from ethanol-water after decolorizing gave 0.6 g. of colorless crystalline (−)-N-cyclopropylmethyl-3-hydroxyisomorphinan hydrochloride, M.P. 258–266° C. (uncorrected);

$[\alpha]_D^{25} = -83°$ (c. 0.50, 95% ethanol)

*Example 3*

A mixture of 1.40 g. of (−)-3-hydroxymorphinan, 9.8 ml. of triethylamine, and 1.75 g. of cyclobutylcarbonyl chloride in 75 ml. of dichloromethane was refluxed for twelve hours. The resulting solution was washed with 3 N hydrochloric acid, then with water, and dried and concentrated. There was thus obtained 2.29 g. of the bis-cyclobutylcarbonyl derivative of (−)-3-hydroxymorphinan. This amorphous product absorbed strongly at 1730–1750 and at 1610–1630 cm.$^{-1}$ in the infrared; it was used without further purification in the next step.

A solution of 2.28 g. of the bis-cyclobutylcarbonyl derivative of (−)-3-hydroxymorphinan and 0.5 g. of lithium aluminum hydride in 120 ml. of purified tetrahydrofuran was heated under reflux for twenty-one hours. The excess hydride was decomposed by the addition of ethyl acetate, and the mixture was treated with 125 ml. of saturated aqueous ammonium tartrate solution, stirred for one hour, and extracted several times with dichloromethane. The washed, dried, and concentrated dichloromethane solution yielded 1.86 g. of crude material, M.P. 216.5–219.5° C. which after several crystallizations from ethyl acetate gave 1.09 g. of (−)-N-cyclobutylmethyl-3-hydroxymorphinan as a white solid which melted at 219.2–219.8° C. and had $[\alpha]_D^{28} = -92 \pm 1°$ (c. 1.03, pyridine). Its methiodide, prepared in methanol and crystallized from 50% aqueous methanol, melted at 256–257° C. (dec.).

When the racemic and (+) forms are substituted for the (−) forms of the starting materials used in the foregoing examples, the final products are of course the racemic and (+) forms, respectively, of the N—(CH$_2$—Y)-6-hydroxy-1,3,4,9,10,10a-hexahydro-2H-10,4a-iminoethanophenanthrenes of Formula I hereinabove.

In human subjects, the new compounds of this invention are valuable and effective agents for producing analgesia when administered in the general range of about 0.001 to 5 mg. per kg. of subject weight, the dosage depending of course on the particular compound, the mode of administration, and the like. When intramuscular administration is employed, the preferred dose is ordinarily in the approximate range 0.004 mg./kg. to 0.016 mg./kg. For oral administration either the free base form or a salt is used; and for parenteral (usually intramuscular) administration there is used an aqueous solution of a soluble, non-toxic salt, for instance such as the lactate salt. The following clinical results which were obtained in human subjects are illustrative.

A solution of 2.0 g. of (−)-N-cyclopropylmethyl-3-hydroxymorphinan, obtained as described in Example 1 above, in 0.086 ml. of 85 percent lactic acid was diluted with water to a volume of 100 ml. When the resulting solution (pH 4.3) was administered intramuscularly to postoperative human subjects (average weight on the order of 70 kg.) at a dose of 0.5 mg. (calculated as base), effective and satisfactory analgesia was produced in the subjects and the drug was well-tolerated. The degree of analgesia produced by the 0.5 mg. dosage level was superior to that produced by 10 mg. of morphine.

In animals, the compounds of this invention were found to produce antagonism of morphine and meperidine analgesia, and to have muscle relaxant, anticonvulsant and central depressant properties. Illustrative results in these regards are described below.

When tested as analgesics in rats by a modified D'Amour-Smith test procedure (blocking of tail-flick response caused by application of radiant heat to the tail), (−)-N-cyclopropylmethyl-3-hydroxymorphinan gave negative results at subcutaneous dosage levels of 60 and 120 mg./kg., whereas (−)-cyclobutylmethyl-3-hydroxymorphinan gave positive results, the percent of maximum possible effect at subcutaneous dosage levels of 30, 60, and 120 mg./kg. being 57 percent, 41 percent, and 79 percent, respectively. Using mice in the Eddy hot plate method with paw-licking as the end-point, the calculated ED$_{50}$ was 73 mg./kg. s.c. for (−)-N-cyclopropylmethyl-3-hydroxymorphinan and for meperidine was 45 mg./kg.

(−)-N-cyclopropylmethyl-3-hydroxymorphinan and (−)-N-cyclobutylmethyl-3-hydroxymorphinan effectively counteracted morphine and meperidine analgesia in rats. Graded dosages of the antagonist were administered subcutaneously ten minutes prior to medication with meperidine hydrochloride (60 mg./kg. s.c.) or morphine sulfate (15 mg./kg. s.c.). Thirty minutes later, all animals were tested for response to radiant heat applied to the tail and the doses producing a 50% antagonism (AD$_{50}$) of the analgesic effect of morphine and meperidine were calculated. The results obtained using the cyclopropylmethyl compound were as follows, using nalorphine as a reference drug:

|  | AD$_{50}$, Morphine | | AD$_{50}$, Meperidine | |
|---|---|---|---|---|
|  | Mg./kg.[1] | Micromoles/kg.[1] | Mg./kg. | Micromoles/kg. |
| Nalorphine | 0.130 | 0.42 | 0.134 | 0.43 |
| Cyclopropylmethyl compound | 0.038 | 0.128 | 0.034 | 0.114 |

[1] Expressed in terms of the base.

In a similar test, the AD$_{50}$ for (−)-N-cyclobutylmethyl-3-hydroxymorphinan versus meperidine was found to be 6.4 mg./kg. subcutaneously.

In an inclined screen test procedure, using mice, (−)-N-cyclopropylmethyl-3-hydroxymorphinan was compared with meprobamate. The numbers of mice falling off during a thirty minute observation period were used for calculation of the respective ED$_{50}$ values, which were found to be: 15 mg./kg. s.c. for the cyclopropylmethyl compound and about 128 mg./kg. for meprobamate. Intravenous administration of 5 mg./kg. of (−)-N-cyclopropylmethyl-3-hydroxymorphinan into anesthetized cats produced a marked reduction of the linguomandibular reflex while having only very slight effect on the patellar reflex; the test compound was about 4 to 5 times as potent as mephenesin in this regard. (−)-N-cyclopropylmethyl-3-hydroxymorphinan was also found to be a potent anticonvulsant when tested in mice according to the metrazol and maximal electroshock procedures; it was approximately one-half to one-third as active as phenobarbital in blocking seizures due to intravenous metrazol (50 mg./kg.), the calculated ED$_{50}$ values being 20.5 ±2.0 mg./kg. i.p. and 8.9 ±2.7 mg./kg. i.p., respectively; and maximal electroshock convulsions, elicited by 50 ma. applied to both cornea, failed to occur in 50 percent of the mice after 24.5 mg./kg. i.p. of the cyclopropylmethyl compound and 6.2 mg./kg. of 5,5-diphenylhydantoin.

Studies which were made of the acute intravenous toxicity of (−) - N - cyclopropylmethyl - 3 - hydroxymorphinan in mice and rats, intradermal irritation in rabbits, and dosage-tolerance in monkeys are summarized as follows:

*Acute toxicity in mice and rats.*—The test compound was tested at three dose levels employing 10 animals per dose. The calculated intravenous lethal dose for 50 percent of the animals (LD$_{50}$) was 24 ±2.0 mg./kg. for mice and 23 ±1.4 mg./kg. for rats.

*Intradermal irritation in rabbits.*—Mild irritation was observed after administration of 0.25 percent solution of the test compound. The threshold irritant concentration according to the Trypan Blue procedure was calculated as 0.25 percent.

*Tolerance of single i.m. doses in monkeys.*—Two groups of two rhesus monkeys each received the test compound on alternate days. Single intramuscular doses of 0.25 to 8.0 mg./kg. were administered as a 2 percent solution. The monkeys were observed carefully for changes in respiratory rate, heart rate, general behavior, appearance of the eyes, eating habits and defection. The injection sites were examined for evidence of pain, redness, and swelling. The results indicate that:

0.25 mg./kg. was very well tolerated; no pharmacologic activity was observed.

0.5 to 4.0 mg./kg. was tolerated; dose related sedation, incoordination, respiratory depression and inactivity were observed. In addition, slight depression of heart rate wa noted at 4.0 mg./kg.

8.0 mg./kg. led to severe pharmacologic reactions: severe ataxia and prostration, moderate depression of respiratory rate and heart rate, profuse salivation. Gradual recovery began one hour after injection and was completed within 6 to 8 hours.

The body weight and food consumption of monkeys injected intramuscularly with the test compound were normal throughout this study. There was no evidence of pain, redness or swelling at the sites of injection. In morphine-addicted monkeys at doses in the range of 0.04 to 0.25 mg./kg., the test compound precipitated withdrawal symptoms of maximum intensity (and was thus incapable of supporting morphine addiction), and was distinguished by a remarkable duration of action (24 hours).

I claim:

1. N-(CH$_2$-Y)-6-hydroxy - 1,3,4,9,10,10a - hexahydro-2H-10,4a-iminoethanophenanthrene having the structural formula

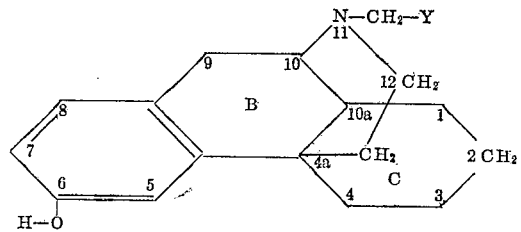

wherein Y is a member of the group consisting of cyclopropyl and cyclobutyl.

2. N-cyclopropylmethyl - 6 - hydroxy-1,3,4,9,10,10a-hexahydro-2H-10,4a-iminophenanthrene.

3. N-cyclobutylmethyl - 6 - hydroxy-1,3,4,9,10,10a-hexahydro-2H-10,4a-iminophenanthrene.

4. (−)-N-cyclopropylmethyl-3-hydroxymorphinan.

5. (−)-N-cyclopropylmethyl-3-hydroxyisomorphinan.

6. (−)-N-cyclobutylmethyl-3-hydroxymorphinan.

7. N-(CH$_2$-Y)-6-methoxy - 1,3,4,9,10,10a - hexahydro-2H-10,4a-iminoethanophenanthrene having the structural formula

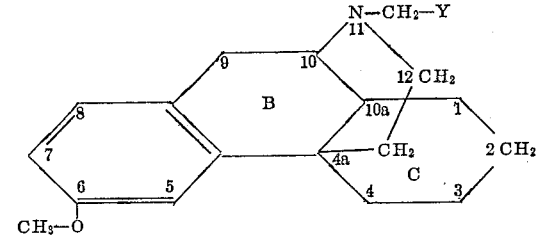

wherein Y is a member of the group consisting of cyclopropyl and cyclobutyl.

8. N-cyclopropylmethyl-3-methoxymorphinan.

9. N-cyclopropylmethyl-3-methoxyisomorphinan.

References Cited by the Examiner

UNITED STATES PATENTS

| 2,524,856 | 10/1950 | Schnider et al. | 260—285 XR |
| 2,746,962 | 5/1956 | Schnider | 260—285 |
| 2,770,569 | 11/1956 | Fromberg | 167—65 |
| 2,885,401 | 5/1959 | Grussner et al. | 260—285 |
| 2,970,147 | 1/1961 | Grussner | 260—285 |
| 3,060,091 | 10/1962 | Witkin | 167—65 |

OTHER REFERENCES

Braun et al.: Ber. Deut. Chem., vol. 54, pages 1081–1090 (1926).

ALEX MAZEL, *Primary Examiner.*

HENRY R. JILES, NICHOLAS S. RIZZO, *Examiners.*

DONALD G. DAUS, *Assistant Examiner.*